United States Patent
Nakanowatari

(10) Patent No.: US 6,962,224 B2
(45) Date of Patent: Nov. 8, 2005

(54) HYBRID VEHICLE EMPLOYING HYBRID SYSTEM

(75) Inventor: Jun Nakanowatari, Tokyo (JP)

(73) Assignee: Nissan Motor Co., Ltd., Yokohama (JP)

(*) Notice: Subject to any disclaimer, the term of this patent is extended or adjusted under 35 U.S.C. 154(b) by 124 days.

(21) Appl. No.: 10/366,370

(22) Filed: Feb. 14, 2003

(65) Prior Publication Data

US 2003/0173123 A1 Sep. 18, 2003

(30) Foreign Application Priority Data

Mar. 18, 2002 (JP) .................................... 2002-074031

(51) Int. Cl.[7] .................................................. B60K 6/04
(52) U.S. Cl. ...................................... 180/65.2; 701/48
(58) Field of Search ............................ 180/65.2, 65.3, 180/65.4, 243; 701/48; 290/40 C

(56) References Cited

U.S. PATENT DOCUMENTS

| | | | | |
|---|---|---|---|---|
| 4,335,429 A | * | 6/1982 | Kawakatsu | 701/102 |
| 4,438,342 A | * | 3/1984 | Kenyon | 290/45 |
| 5,346,031 A | * | 9/1994 | Gardner | 180/179 |
| 5,495,906 A | * | 3/1996 | Furutani | 180/65.2 |
| 5,664,635 A | * | 9/1997 | Koga et al. | 180/65.3 |
| 5,785,138 A | * | 7/1998 | Yoshida | 180/65.2 |
| 6,258,006 B1 | * | 7/2001 | Hanyu et al. | 477/5 |
| 6,522,024 B1 | * | 2/2003 | Takaoka et al. | 290/40 C |
| 6,617,704 B2 | * | 9/2003 | Tomikawa | 290/40 C |

FOREIGN PATENT DOCUMENTS

| | | |
|---|---|---|
| JP | 6-173745 A | 6/1994 |
| JP | 9-224304 A | 8/1997 |
| JP | 10-309003 A | 11/1998 |
| JP | 2000-127790 A | 5/2000 |
| JP | 2000-265866 A | 9/2000 |
| JP | 2000-295713 A | 10/2000 |
| JP | 2000-352332 A | 12/2000 |
| JP | 2001-107799 A | 4/2001 |
| JP | 2002-46507 A | 2/2002 |

* cited by examiner

Primary Examiner—Frank Vanaman
(74) Attorney, Agent, or Firm—Foley & Lardner LLP

(57) ABSTRACT

In a hybrid electric vehicle (HEV) employing a hybrid system using both an internal combustion engine and a second motor/generator as a propelling power source for vehicle propulsion, and also employing a first generator driven by the engine for power generation, an integrated HEV control system is provided to control the engine, and the first and second motor/generators. The integrated HEV control system permits operation of only the second motor/generator as the propelling power source to establish a motor propelled vehicle driving mode and simultaneously basically inhibits operation of the engine, when satisfying at least a condition that the engine misfire occurs. If a power generation requirement or a battery recharge requirement is present during the misfire period, operation of the engine is temporarily permitted for driving the first motor/generator only for a battery recharge.

7 Claims, 4 Drawing Sheets

HYBRID VEHICLE EMPLOYING HYBRID SYSTEM

TECHNICAL FIELD

The present invention relates to a hybrid electric vehicle (HEV) employing a hybrid system using both an internal combustion engine and an electric motor (or an electric motor/generator) as a propelling power source, and specifically to the improvement of technologies for controlling an internal-combustion-engine/electric motor-driven hybrid vehicles.

BACKGROUND ART

In recent years, there have been proposed and developed hybrid-system equipped vehicles using both an engine and an electric motor as a propelling power source. On such hybrid system equipped vehicles, in order to effectively suppress or reduce positive and negative torque fluctuations in an internal combustion engine, it is important to precisely detect, determine or judge the presence or absence of an engine misfire. One such hybrid vehicle having an engine-misfire detection function has been disclosed in Japanese Patent Provisional Publication No. 2000-352332 (hereinafter is referred to as "JP2000-35233").

SUMMARY OF THE INVENTION

When continually running an internal combustion engine in which a misfire occurs, without any engine power output limits, there is a problem of undesired vibrations and noises caused by periodical torque fluctuations. Additionally, in presence of the engine misfire, there is another problem of an excessive temperature rise in catalyst provided in an exhaust-system catalytic converter. This leads to a shortened life of the catalyst. To avoid the aforementioned problems, namely undesired vibrations and noises and excessive catalyst temperature rise in the presence of the engine misfire, on hybrid vehicles using both an engine and an electric motor as a propelling power source, it would be desirable to optimally properly control operating modes of the engine and the motor.

It is a general object of this invention to provide an improved control system of a hybrid vehicle, capable of avoiding undesired vibrations and noises and excessive catalyst temperature rise by optimally controlling operating modes of an internal combustion engine and an electric motor (or a motor/generator), while continuing a stable running state of the hybrid vehicle even in presence of an engine misfire during operation of the engine.

It is another object of the invention to provide an improved control system of a hybrid vehicle, capable of avoiding undesired vibrations and noises and excessive catalyst temperature rise by optimally controlling operating modes of an internal combustion engine and an electric motor (or a motor/generator) depending on at least one of a state of charge (SOC) of a car battery, a misfire rate, a generated efficiency, a generated energy, and a catalyst temperature, while continuing a stable running state of the hybrid vehicle even in presence of an engine misfire during operation of the engine.

In order to accomplish the aforementioned and other objects of the present invention, a hybrid vehicle comprises an internal combustion engine serving as a propelling power source for vehicle propulsion, an electric motor serving as a propelling power source for vehicle propulsion, an electric generator driven by the engine for power generation, a battery electrically connected to the motor and the generator, sensors and switches for detecting operating conditions on the engine and the vehicle, and a control system electrically connected to the engine, the motor, the generator, the battery and the sensors and switches, for controlling the engine, the motor and the generator, the control system comprising an engine misfire determination section that determines whether an engine misfire occurs, and a control section that permits operation of only the motor as the propelling power source to establish a motor propelled vehicle driving mode and simultaneously inhibits operation of the engine, when satisfying a predetermined first condition comprising at least a condition that the engine misfire occurs.

According to another aspect of the invention, a hybrid vehicle comprises an internal combustion engine serving as a propelling power source for vehicle propulsion, an electric motor serving as a propelling power source for vehicle propulsion, an electric generator driven by the engine for power generation, a battery electrically connected to the motor and the generator, sensors and switches for detecting operating conditions on the engine and the vehicle, and a control system electrically connected to the engine, the motor, the generator, the battery and the sensors and switches, for controlling the engine, the motor and the generator, the control system comprising engine misfire determination means for determining whether an engine misfire occurs, and control means for permitting operation of only the motor as the propelling power source to establish a motor propelled vehicle driving mode and simultaneously for inhibiting operation of the engine, when satisfying a predetermined first condition comprising at least a condition that the engine misfire occurs.

According to a further aspect of the invention, a method of controlling a hybrid vehicle employing an internal combustion engine serving as a propelling power source for vehicle propulsion, an electric motor serving as a propelling power source for vehicle propulsion, an electric generator driven by the engine for power generation, a battery electrically connected to the motor and the generator, and sensors and switches for detecting operating conditions on the engine and the vehicle, the method comprising determining whether an engine misfire occurs, permitting operation of only the motor as the propelling power source to establish a motor propelled vehicle driving mode when satisfying at least a condition that the engine misfire occurs, and simultaneously inhibiting operation of the engine, when satisfying the condition that the engine misfire occurs.

The other objects and features of this invention will become understood from the following description with reference to the accompanying drawings.

DESCRIPTION OF THE PREFERRED EMBODIMENTS

Figure 1:
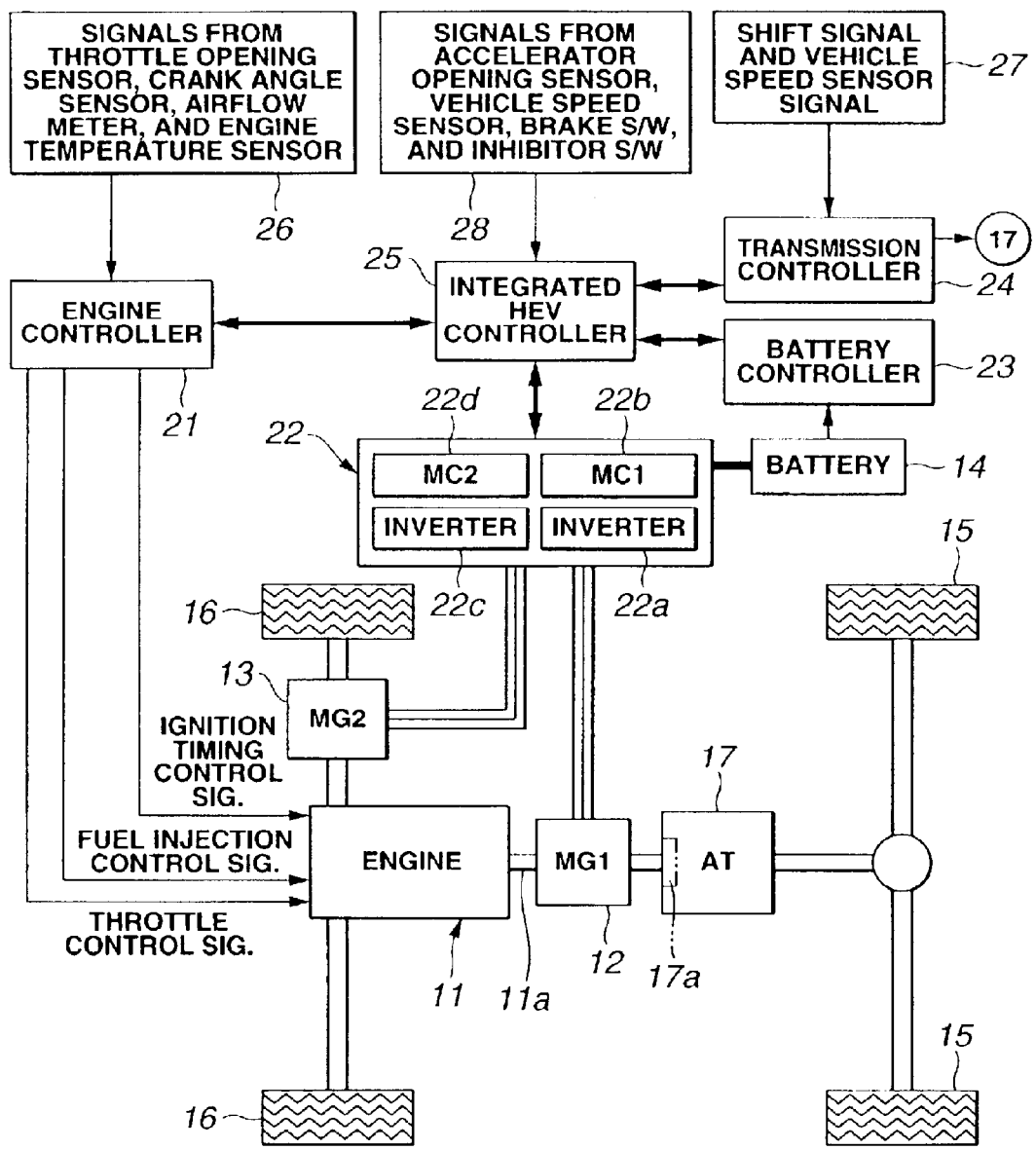
FIG. 1 is a system block diagram illustrating one embodiment of a control system of a hybrid electric vehicle (HEV) made according to the invention.

Referring now to the drawings, particularly to FIG. 1, a hybrid-electric-vehicle (HEV) control system of the embodiment is exemplified in a parallel hybrid electric vehicle using both an internal combustion engine and an electric motor (or an electric motor/generator) for propulsion. As seen from the system block diagram shown in FIG. 1, the hybrid vehicle is comprised of (i) an internal combustion engine 11 that produces power by combusting fuel such as gasoline, diesel fuel oil, liquefied petroleum gas, or the like, (ii) a first motor/generator (MG1) 12 electrically connected to a car battery 14 and enables both a power running mode and a regenerative running mode, and (iii) a second motor/generator (MG2) 13 electrically connected to battery 14 and enables both a power running mode and a regenerative running mode. Battery 14 is a conventional electrochemical device that stores electric energy in chemical form. Engine 11 is connected or linked to a pair of rear road wheels 15, 15, both serving as main drive wheels, to drive them. First motor/generator (MG1) 12 is mainly driven by means of engine 11 and serves as a generator (during the regenerative running mode) that generates electricity and recharges the battery. During the power running mode, first motor/generator (MG1) 12 also serves as an engine start-up motor (or an engine starter) that starts up the engine. First motor/generator 12 is connected directly to an output shaft (an engine crankshaft) 11a of engine 11. Therefore, the rotational speed of first motor/generator 12 is always equal to an engine speed of engine 11. Second motor/generator (MG2) 13 is connected or linked to a pair of front road wheels 16, 16, both serving as auxiliary drive wheels. During the power running mode, second motor/generator (MG2) 13 mainly serves as a drive motor, which drives front road wheels 16, 16. That is to say, second motor/generator (MG2) 13 (operated in the power running mode) as well as engine 11 functions as a propelling power source used for vehicle propulsion. Conversely when a required driving torque is a negative value, second motor/generator 13 can be operated in the regenerative running mode for energy regeneration. As may be appreciated from the above, in the hybrid vehicle of the embodiment, rear road wheels 15, 15 can be mainly driven by means of engine 11, whereas front road wheels 16, 16 can be subsidiarily driven by means of second motor/generator 13 in case of necessity. As discussed above, the hybrid vehicle using both engine 11 and second motor/generator (MG2) 13 for vehicle propulsion functions as a hybrid electric four-wheel-drive vehicle without using a transfer device. An automatic transmission (AT) 17 is provided in a power-transmission path from engine 11 to rear road wheels 15, 15, so as to automatically change a reduction ratio or a transmission gear ratio, that is, a ratio of output speed to input speed and a ratio of output torque to input torque. Automatic transmission 17 includes a clutch element or a clutch device 17a that connects and disconnects the rear wheel side to and from each of engine crankshaft 11a and first motor/generator (MG1) 12. Automatic transmission 17 may be comprised of a planetary-gear systems equipped automatic transmission whose number of speeds is limited or finite. Alternatively, automatic transmission 17 may be comprised of a continuously variable transmission (CVT), such as a belt-drive continuously variable transmission or a toroidal continuously variable transmission.

As clearly shown in FIG. 1, the HEV control system of the embodiment is comprised of an engine controller 21, a motor/generator controller 22, a battery controller 23, a transmission controller 24, and an integrated electronic hybrid electric vehicle (HEV) control unit or an electronic hybrid electric vehicle control module (HCM) 25. Each of controllers 21 to 24 is electrically connected to integrated HEV controller 25 to communicate with the integrated HEV controller through a data link (a plurality of signal lines). Each of control units 21 to 25 generally comprises a microcomputer that includes a central processing unit (CPU) or a microprocessor (MPU), memories (RAM, ROM), and an input/output interface (I/O). The input/output interface (I/O) receives input information from various engine/vehicle switches and sensors, such as a throttle opening sensor, a crank angle sensor (or a crankshaft position sensor), an airflow meter (an airflow sensor), an engine temperature sensor (an engine coolant temperature sensor), a catalyst temperature sensor, an accelerator opening sensor, a vehicle speed sensor, a brake switch, an inhibitor switch (or a selector-lever position switch), a SOC (state of charge) sensor (a battery voltage detector and a battery current detector), an ignition switch and the like. Within the controllers, the central processing units (CPUs) allow the access by the I/O interface of input informational data signals from engine/vehicle switches and sensors, and are responsible for carrying various control programs stored in the memories and capable of performing necessary arithmetic and logic operations. The engine/vehicle switches and sensors are provided to detect or monitor specific operating conditions on the engine or vehicle. Computational results or arithmetic calculation results, in other words, calculated output signals or control signals are relayed via the output interface circuitries of the controllers to output stages, for example, the shift valves of the automatic transmission, fuel injectors, spark plugs, an electronically-controlled throttle valve actuator, first motor/generator 12 (exactly, a first inverter 22a (described later)), second motor/generator 13 (exactly, a second inverter 22c), and clutch element 17a installed in automatic transmission 17. Concretely, various engine controls for engine 11, such as ignition timing control (the ignition timing of each spark plug), fuel injection control (the amount of fuel injected from each individual injector and injection initiation timing) and throttle opening control, are executed in response to respective control signals from engine controller 21. Various motor/generator controls, such as torque control and speed control for each of first motor/generator 12 and second motor/generator 13, are executed in response to respective control signals from motor/generator controller 22. Battery controller 23 is provided to properly control a state of charge (SOC) of battery 14. The speed-change control (upshift or downshift) for automatic transmission 14 is executed in response to a control signal from transmission control unit 24. Motor/generator controller 22 also controls switching between the power running mode and the regenerative running mode of each of motor/generators 12 and 13.

In more detail, the input interface of engine controller 21 receives input information from the engine/vehicle switches and sensors, such as the throttle opening, crank angle (including the relative position of the crankshaft as well as engine speed), intake-air quantity, engine temperature and catalyst temperature, and also receives information, indicative of a required engine torque, generated from integrated HEV controller 25. Based on the input information, the CPU of engine controller 21 calculates or computes an ignition timing and a fuel injection amount based on the throttle opening, engine speed, intake-air quantity, and required engine torque, and to output an ignition timing control signal, a fuel injection control signal to engine 11. In case of the use of an electronically-controlled throttle, the CPU of engine controller 21 outputs a throttle control signal indicative of a desired throttle opening to the electronically-controlled throttle actuator. In addition to the above, the processor of engine controller 21 detects, determines or judges, based on a rapid change in engine speed and/or a rapid change in engine torque, whether or not an engine misfire occurs. Engine controller 21 also includes an ignition counter and an engine-misfire counter, which will be hereinafter described in detail in reference to the misfire detection routine shown in FIG. 4. The method of detecting an engine misfire itself is conventional and forms no part of the present invention, typical details of such misfire detecting method being set forth, for example, in Japanese Patent Provisional Publications JP2000-352332 and JP6-173745. For instance, engine controller 21 detects a rapid drop in total engine torque generated by the engine (or a rapid drop in torque generated by at least one of the individual engine cylinders) and/or a rapid drop in engine speed, based on the input informational data, namely the throttle opening, intake-air pressure (intake manifold pressure), range gear position, and vehicle speed, under a particular condition such as during a steady-state running where there are comparatively small fluctuations in engine speed and engine torque. Engine controller 21 may determine or judge that an engine misfire occurs, when there is a rapid drop in engine speed and/or engine torque during the steady-state running. On the other hand, motor/generator controller 22 is comprised of a first inverter 22a, a first motor controller (MC1) 22b, a second inverter 22c, and a second motor controller (MC2) 22d. First inverter 22a is electrically connected to both battery 14 and first motor/generator 12. First motor controller 22b is connected to both first inverter 22a and integrated HEV controller 25. Second inverter 22c is connected to both battery 14 and second motor/generator 13. Second motor controller 22d is connected to both second inverter 22c and integrated HEV controller 25. First motor controller (MC1) 22b is responsive to a command from integrated HEV controller 25 to generate a control signal for first inverter 22a. In a similar manner, second motor controller (MC2) 22d is responsive to a command from integrated HEV controller 25 to generate a control signal for second inverter 22c. That is, first motor/generator (MG1) 12 and second motor/generator (MG2) 13 can be controlled independently of each other. Battery controller 23 is electrically connected to battery 14 to monitor or detect a battery condition containing the battery voltage and current, so as to estimate or compute a state of battery charge (SOC) and to send a battery condition information data signal indicative of the state of charge (SOC) to integrated HEV controller 25. Battery controller 23 also serves to derive a possible output power and a possible input power from the monitored battery condition. Transmission controller (AT controller) 24 controls the gear position of automatic transmission 17 based on a shift signal 27 from the inhibitor switch (or the selector-lever position switch) and a vehicle speed sensor signal. On the other hand, the processor of integrated HEV controller 25 computes or arithmetically calculates a required driving force (a target driving force) corresponding to the required engine torque, based on the vehicle speed sensor signal and the other input information data signals such as the accelerator opening sensor signal, shift signal 27, and signal from the brake switch. The other input information data signals are dependent on a manual operation of the driver. Integrated HEV controller 25 distribute or allots the required driving force into engine 11 and second motor/generator (MG2) 13, so as to send out a target torque indicative command for engine 11 to engine controller 21 and to a target torque indicative command for motor/generator 13 to motor/generator controller 22. When the state of battery charge (SOC), that is, the battery charging rate is high and thus the required driving force can be supplied or generated by means of only the second motor/generator 13, engine 11 is stopped and only the second motor/generator 13 functions as a propelling power source so as to establish a motor propelled vehicle driving mode. Conversely when the required driving force cannot be supplied or generated by means of only the second motor/generator 13, integrated HEV controller 25 properly selects either one of (i) an engine propelled vehicle driving mode in which only the engine 11 functions as a propelling power source and (ii) an engine-plus-motor propelled vehicle driving mode in which both of engine 11 and second motor/generator 13 function as a propelling power source. Although it is not clearly shown in FIG. 1, a catalyst such as a three-way catalyst is provided in an exhaust passage of an exhaust system of engine 11, for purifying exhaust emissions. Each of controllers 21 to 25 comes into operation when inserting the ignition switch into the ignition key cylinder and turning it ON, and then starting a cold engine, that is, during the first engine start-up period. The control action of each of controllers 21 to 25 is continuously executed until the ignition switch is turned OFF and pulled from the ignition key cylinder and thus the engine is stopped.

Figure 2:
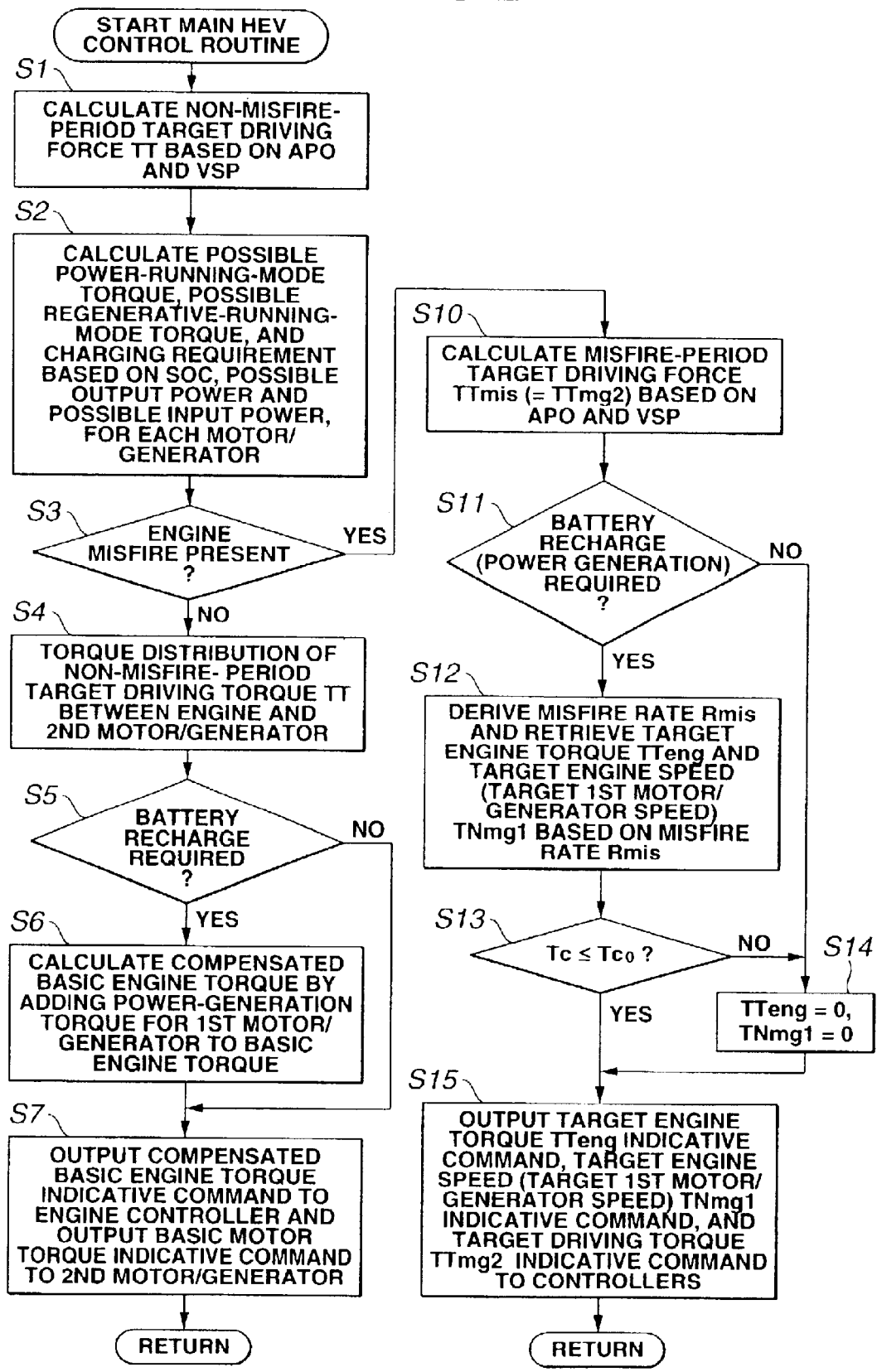
FIG. 2 is a flow chart illustrating a main HEV control routine executed within a HEV controller incorporated in the control system of the hybrid vehicle of the embodiment.

Referring now to FIG. 2, there is shown the main HEV control routine executed by the control system of the hybrid electric vehicle of the embodiment. Within integrated HEV control unit 25, the control routine shown in FIG. 2 is executed as time-triggered interrupt routines to be triggered every predetermined time intervals such as 10 msec.

At step S1, the processor of integrated HEV controller 25 arithmetically calculates or retrieves a non-misfire-period target driving force TT based on an accelerator opening APO corresponding to the accelerator opening sensor signal value and a vehicle speed VSP corresponding to the vehicle speed sensor signal value, from a preprogrammed non-misfire-period TT-APO-VSP characteristic look-up table or a preprogrammed non-misfire-period TT-APO-VSP characteristic map how non-misfire-period target driving force TT has to be varied relative to accelerator opening APO and vehicle speed VSP in absence of a misfire. Non-misfire-period target driving force TT corresponds to a total driving force required to run or propel the vehicle in absence of the misfire. That is, target driving force TT is equal to the sum of a target driving force corresponding to a target driving torque to be applied to rear wheels 15, 15 and a target driving force corresponding to a target driving torque to be applied to front wheels 16, 16, in the absence of the misfire.

At step S2, the processor of integrated HEV controller 25 arithmetically calculates or computes a possible power-running-mode torque, a possible regenerative-running-mode torque, and a charging requirement (or a recharging requirement), based on latest up-to-date battery condition information concerning the battery's state of charge (SOC), the possible output power and the possible input power, for each of motor/generators 12, 13.

At step S3, a check is made to detect or determine whether an engine misfire occurs. The engine misfire determination is executed within engine controller 21 and based on at least one of a rapid fluctuation $\Delta N$ in engine speed N and a rapid fluctuation $\Delta T$ in engine torque T, as hereinafter described in detail in reference to the flow chart shown in FIG. 4. In the shown embodiment, the presence or absence of the engine misfire is determined depending on whether a time rate of change $\Delta N$ of engine speed N is greater than or equal to a predetermined threshold value $\Delta N0$. When the answer to step S3 is in the affirmative (YES), that is, in presence of the engine misfire, the routine proceeds from step S3 to step S10. Conversely when the answer to step S3 is in the negative (NO), that is, in absence of the engine misfire, the routine proceeds from step S3 to step S4.

At step S4, a normal HEV control, in other words, a non-misfire period HEV control is continued. That is, target driving torque TT, calculated through step S1, is distributed or allotted into a basic engine torque to be produced by engine 11 and a basic motor torque to be produced by second motor/generator 13. Thereafter, step S5 occurs.

At step S5, a check is made to determine, based on the battery's state of charge (SOC), whether a battery recharge is required. Concretely, when the battery's state of charge (SOC) is less than a predetermined reference value, integrated HEV controller 25 determines that a battery recharge is needed. When the answer to step S5 is in the affirmative (YES), that is, the battery recharge is needed, the routine proceeds from step S5 to step S6. Conversely when the answer to step S5 is in the negative (NO), that is, the battery recharge is not needed, the routine jumps from step S5 to step S7.

At step S6, an incremental torque (a power-generation torque) needed to drive first motor/generator (MG1) 12 for the purpose of a battery recharge, is added to the basic engine torque calculated at step S4. That is, the basic engine torque is updated by the sum of the incremental torque (the power-generation torque) and the basic engine torque calculated at step S4. In other words, the basic engine torque calculated at step S4 is compensated for and incremented by the incremental torque (the power-generation torque). Subsequently to step S6, step S7 occurs.

At step S7, integrated HEV controller 25 sends or outputs a command corresponding to the compensated basic engine torque to engine controller 21, and sends or outputs a command corresponding to the basic motor torque to be produced by second motor/generator 13 to motor/generator controller 22.

Returning to step S3, in the presence of the engine misfire, the integrated HEV begins to illuminate a warning lamp on the dashboard to warn the driver of the presence of the engine misfire. Then, the routine flows from step S3 to step S10.

At step S10, the processor of integrated HEV controller 25 arithmetically calculates or retrieves a misfire-period target driving force TTmis based on accelerator opening APO and vehicle speed VSP from a preprogrammed misfire-period TT-APO-VSP characteristic look-up table or a preprogrammed misfire-period TT-APO-VSP characteristic map how target driving force TTmis has to be varied relative to accelerator opening APO and vehicle speed VSP in presence of a misfire. Misfire-period target driving force TTmis corresponds to a total driving force required to run or propel the vehicle in presence of the misfire. As described later, when the engine misfire occurs, engine 11 is stopped or engine 11 is driven only for the purpose of driving first motor/generator (MG1) 12. That is, in the presence of the misfire, engine 11 is not used as a propelling power source used for vehicle propulsion, but only the second motor/generator (MG2) 13, which is in the motor propelled vehicle driving mode, is used as a propelling power source. Therefore, misfire-period target driving force TTmis itself corresponds to a target driving torque TTmg2 to be produced by second motor/generator (MG2) 13. For this reason, misfire-period target driving force TTmis is limited to a driving force that is able to be output by second motor/generator 13. Generally, misfire-period target driving force TTmis calculated or retrieved through step S10 is set to be less than non-misfire-period target driving force TT calculated or retrieved through step S1.

In the system of the shown embodiment, during the misfire determination period, clutch element 17a installed in automatic transmission 17 is disengaged to disconnect the rear wheel side from each of engine crankshaft 11a and first motor/generator (MG1) 12. Thus, a target engine torque TTeng of engine 11 is set to be equal to a target power-generation torque TTmg1 of first motor/generator (MG1) 12 (see step S15 (described later) of FIG. 2).

After step S10, step S11 occurs. Step S11 is similar to step S5. At step S11, a check is made to determine, based on the state of battery charge (SOC), whether a power generation (or a battery recharge) is required. Concretely, when the battery's state of charge (SOC) is less than the predetermined reference value, integrated HEV controller 25 determines that a power generation (or a battery recharge) is needed. When the answer to step S11 is in the affirmative (YES), that is, the power generation (the battery recharge) is needed, the routine proceeds from step S11 to step S12. Conversely when the answer to step S11 is in the negative (NO), that is, the power generation (the battery recharge) is not needed, the routine advances from step S11 to step S14.

At step S14, target engine torque TTeng of engine 11 is set to "0", and additionally a target rotational speed TNmg1 of first motor/generator (MG1) 12 (=a target engine speed) is set to "0". Thereafter, step S15 occurs.

At step S15, integrated HEV controller 25 sends or outputs a command corresponding to target engine torque TTeng (set through step S14), a command corresponding to target rotational speed TNmg1 (set through step S14) of first motor/generator (MG1) 12, and a command corresponding to target driving torque TTmg2 (set through step S10) to be produced by second motor/generator (MG2) 13 to the corresponding controllers 21 and 22.

Returning to step S11, in the presence of a power-generation requirement (or a battery recharge requirement), that is, when the state of battery charge (SOC) is less than the predetermined reference value, step S12 occurs.

Figure 3:
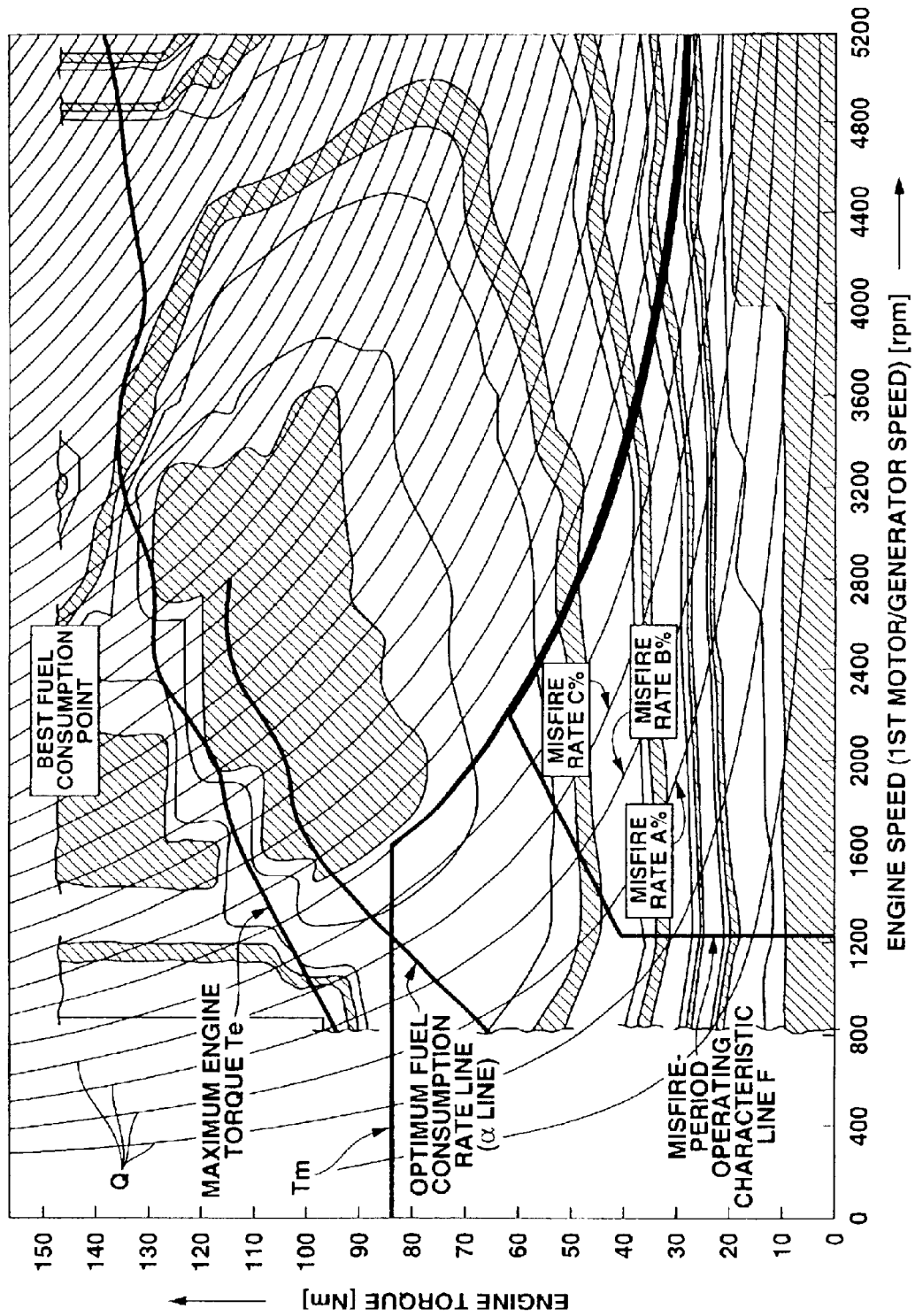
FIG. 3 is a preprogrammed control map used to set an engine operating range containing both a target engine speed TNmg1 and a target engine torque TTeng during an engine misfire period.

At step S12, target engine torque TTeng of engine 11 and target rotational speed TNmg1 of first motor/generator (MG1) 12 (=the rotational speed of engine crankshaft 11a, i.e., the target engine speed) are arithmetically calculated or retrieved based on a misfire rate Rmis from a preprogrammed characteristic map shown in FIG. 3. Regarding the characteristic map of FIG. 3, the heavy solid line Tm indicates a torque characteristic of first motor/generator (MG1) 12, while the heavy solid line Te indicates a maximum engine torque characteristic of engine 11. A plurality of curved lines Q that construct the left-hand diagonal shading in the characteristic map of FIG. 3, show engine characteristic curves at various misfire rates such as a misfire rate A %, a misfire rate B %, and a misfire rate C % (A>B>C). A fuel consumption rate α (unit: g/kWh) of engine 11, which is in individual operation, has been derived or obtained with respect to both engine speed N (=the rotational speed of first motor/generator 12) and engine torque T on the characteristic curve Q for every misfire rate (A %, B %, C %, . . . ). Also, a generated energy W is based on engine speed N and engine torque T. A generated efficiency β can be calculated based on four parameters N, T, α, W, derived or retrieved based on a current value of the misfire rate from the predetermined characteristic map shown in FIG. 3, as follows.

$$\beta = W/(N \times T \times \alpha) \quad (1)$$

Thereafter, integrated HEV controller 25 derives or computes a misfire-period maximum possible rotational speed Nmismx of a limited engine speed range (or a limited first motor/generator speed range) in which generated energy W is greater than or equal to a predetermined generated energy $W_{max} \times k$ (%) (i.e., $W \geq W_{max} \times k$) and generated efficiency $\beta$ is greater than or equal to a predetermined generated efficiency $\beta_{max} \times j$ (%) (i.e., $\beta \geq \beta_{max} \times j$). A character $W_{max}$ denotes a maximum generated energy produced by first motor/generator 12 at each misfire rate Rmis, whereas a character $\beta_{max}$ denotes a maximum generated efficiency of first motor/generator 12 at each misfire rate Rmis. The aforementioned predetermined generated energy $W_{max} \times k$ is preset as a predetermined constant percentage (e.g., k=80%) of maximum generated energy $W_{max}$ produced by first motor/generator 12 at each misfire rate Rmis. Likewise, the aforementioned predetermined generated efficiency $\beta_{max} \times j$ is preset as a predetermined constant percentage (e.g., j=80%) of maximum generated efficiency $\beta_{max}$ of first motor/generator 12 at each misfire rate Rmis. These correction factors k and j change depending upon actual engine characteristics and actual motor/generator characteristics. Generated energy W and/or generated efficiency $\beta$ is correlated to an operating time of engine 11, in other words, a battery recharging time. As a matter of course, the better generated energy and/or the better generated efficiency contributes to shortened operating time of engine 11 (i.e., shortened battery recharging time). Misfire-period maximum possible rotational speed Nmismx tends to gradually reduce, as the misfire rate increases. Therefore, supposing that the misfire rate exceeds a certain rate greater than the misfire rate A %, a minimum speed (a lowest engine speed or a lowest first motor/generator speed) that enables the engine to continue to operate must be preset properly. As can be seen from the solid heavy vertical straight line corresponding to a part of the misfire-period engine operating characteristic line F shown in FIG. 3, in the shown embodiment the minimum speed is preset to a predetermined speed such as 1200 rpm. When misfire-period maximum possible rotational speed Nmismx is less than the preset minimum speed (e.g., 1200 rpm), the preset minimum speed is set as the misfire-period maximum possible rotational speed Nmismx. In this manner, during the misfire period, the misfire-period maximum possible rotational speed Nmismx is determined according to the misfire-period engine operating characteristic line F shown in FIG. 3. The misfire-period engine operating characteristic line F of FIG. 3 is obtained by continually connecting a plurality of points of misfire-period maximum possible rotational speeds Nmismx, plotted for every misfire rates Rmis. After this, the determined misfire-period maximum possible rotational speed Nmismx is set to target engine speed TNmg1 (=the target rotational speed TNmg1 of first motor/generator (MG1) 12). As can be appreciated from the above, target engine speed TNmg1 and target engine torque TTeng can be derived or determined by properly selecting a point on the misfire-period engine operating characteristic line F of FIG. 3, depending on a current value of the misfire rate, calculated according to the subroutine (described later) shown in FIG. 4 at the current control cycle.

Returning to the main HEV control routine of FIG. 2, subsequently to step S12, step S13 occurs.

At step S13, a check is made to determine whether a catalyst temperature Tc is less than or equal to a predetermined temperature value Tc0 above which the catalyst may be damaged. Catalyst temperature Tc may be detected by means of a catalyst temperature sensor. In lieu thereof, catalyst temperature Tc may be estimated from the misfire rate Rmis. When the answer to step S13 is in the negative (NO), that is, catalyst temperature Tc exceeds predetermined temperature Tc0 and thus there is an increased tendency for the catalyst to be damaged, the routine proceeds from step S13 to step S14. As discussed above, through step S14, target engine torque TTeng is set to "0", and additionally target engine speed TNmg1 (=the target rotational speed of first motor/generator (MG1) 12) is set to "0". Conversely when the answer to step S13 is in the affirmative (YES), that is, catalyst temperature Tc is less than predetermined temperature Tc0 and thus there is a less tendency for the catalyst to be damaged, the routine proceeds from step S13 to step S15. As discussed above, through step S15, integrated HEV controller 25 sends a command corresponding to target engine torque TTeng, a command corresponding to target engine speed TNmg1, and a command corresponding to target driving torque TTmg2 to the corresponding controllers 21 and 22.

Figure 4:
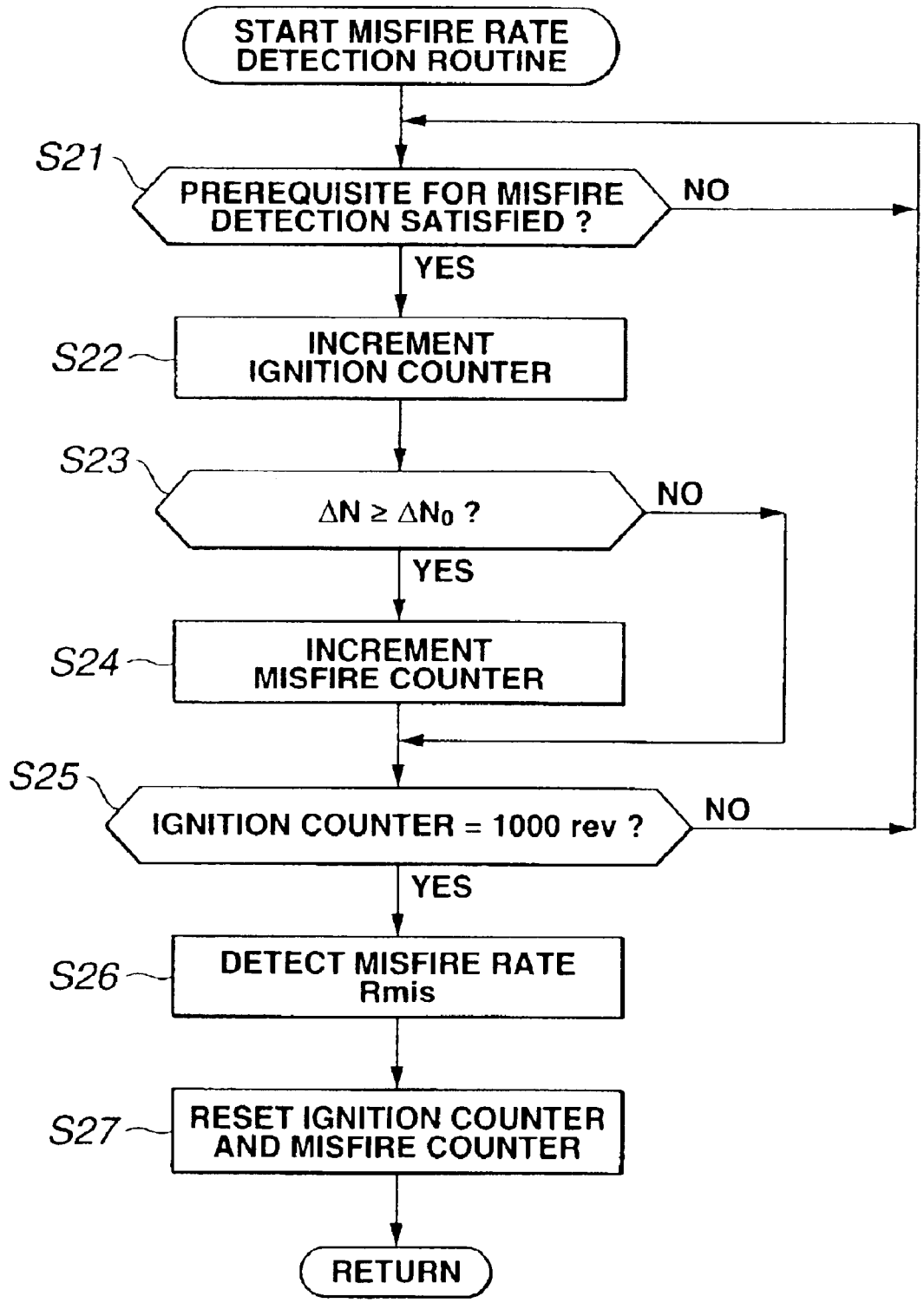
FIG. 4 is a flow chart illustrating a misfire rate detection subroutine.

Referring now to FIG. 4, there is shown the misfire rate detection routine needed to derive or compute misfire rate Rmis used at step S12 of FIG. 2. Within integrated HEV control unit 25, the subroutine of FIG. 4 is executed as time-triggered interrupt routines to be triggered every predetermined time intervals such as 10 msec.

At step S21, a check is made to determine whether a prerequisite suitable for engine misfire detection is satisfied. For instance, engine temperature Tw (coolant temperature) and engine speed N are often used as the prerequisite for misfire detection. More concretely, when engine temperature Tw is greater than or equal to a predetermined engine temperature such as −10° C. and engine speed N is greater than or equal to a predetermined engine speed such as 450 rpm, integrated HEV controller 25 determines that the prerequisite for misfire detection is satisfied. When the answer to step S21 is in the affirmative (YES), that is, the prerequisite is satisfied, the routine proceeds from step S21 to step S22. Conversely when the answer to step S21 is in the negative (NO), that is, the prerequisite is unsatisfied, the routine returns again to step S21.

At step S22, the counted value of the ignition counter incorporated in engine controller 21 is incremented by the current value of engine speed N. The counted value of the ignition counter is incremented every misfire-detection cycle and reset to "0" when the counted value of the ignition counter reaches a predetermined accumulated number of revolutions such as 1000 revolutions.

At step S23, a check is made to determine whether time rate of change $\Delta N$ of engine speed N is greater than or equal to predetermined threshold value $\Delta N_0$. When the answer to step S23 is affirmative (YES), that is, in case of $\Delta N \geq \Delta N_0$, the routine proceeds from step S23 to step S24. Conversely when the answer to step S23 is negative (NO), that is, in case of $\Delta N < \Delta N_0$, the routine jumps from step S23 to step S25. The inequality $\Delta N \geq \Delta N_0$ means that positive and negative fluctuations in engine speed N are comparatively high and therefore an engine misfire occurs. On the other hand, the inequality $\Delta N < \Delta N_0$ means that positive and negative fluctuations in engine speed N are comparatively low and therefore an engine misfire does not occur. The decision result of step 23 is used at step S3 of the main routine shown in FIG. 2.

At step S24, the counted value of the misfire counter incorporated in engine controller 21 is incremented by "1". Thereafter, step S25 occurs.

At step S25, a check is made to determine whether the counted value of the ignition counter reaches the predetermined accumulated number of revolutions such as 1000 revolutions. When the answer to step S25 is affirmative (YES), that is, in case of Ignition Counter=1000 rev, the routine proceeds from step S25 to step S26. Conversely when the answer to step S25 is negative (NO), that is, in case of Ignition Counter≦1000 rev, the routine returns from step S25 to step S21.

At step S26, misfire rate Rmis is detected or calculated based on the counted value of the misfire count, incremented through step S24 each time the two conditions of steps S21 and S23 are satisfied at each execution cycle of the misfire detection subroutine. In other words, by way of a series of steps S21 to S26, it is possible to derive, estimate, or detect the misfire rate Rmis once for each predetermined accumulated number of revolutions such as 1000 revolutions. Subsequently to step S26, step S27 occurs.

At step S27, the ignition counter and the misfire counter are both cleared or reset to "0", that is, Ignition Counter=0 and Misfire Counter=0.

The operation and effects of the control system of the hybrid vehicle of the embodiment are briefly described hereunder.

(A) When satisfying a predetermined first condition where integrated HEV controller determines or decides that engine 11 misfires and additionally the state of battery charge (SOC) is greater than or equal to the predetermined reference value, only the second motor/generator (MG2) 13 operates as a propelling power source to establish a motor propelled vehicle driving mode and engine 11 is basically stopped (see the flow from step S3 through steps S10 and S11 to step S14 in FIG. 2). Therefore, even during the misfire period, it is possible to continue the vehicle running state, while avoiding the catalyst from being considerably damaged due to an excessive catalyst temperature rise, because of the stopped state of engine 11.

(B) When satisfying a predetermined second condition where integrated HEV controller determines or decides that engine 11 misfires and additionally the state of battery charge (SOC) is less than the predetermined reference value, second motor/generator (MG2) 13 is operated as a propelling power source to establish a motor propelled vehicle driving mode and additionally engine 11 is operated only for the purpose of driving the first motor/generator (MG1) 12 for a battery recharge (see the flow from step S3 through steps S10 and S11 to step S12 in FIG. 2). Therefore, in presence of a battery recharge requirement during the misfire period, it is possible to effectively suppress an excessive catalyst temperature rise to a minimum by limiting an operating state of engine 11 to a minimum acceptable operating level needed to maintain the state of battery charge (SOC) above a predetermined reference SOC level, while continuing the vehicle running state with the second motor/generator (MG2) 13 in operation.

(C) When satisfying a predetermined third condition where integrated HEV controller determines or decides that engine 11 misfires and additionally catalyst temperature Tc is greater than predetermined temperature value $Tc_0$, engine 11 is forcibly stopped. That is, in case of $Tc>Tc_0$, operation of engine 11 is inhibited (see the flow from step S3 through steps S10, S11, S12, and S13 to step S14 in FIG. 2). Thus, it is possible to suppress an excessive catalyst temperature rise and to avoid the catalyst from being damaged by forcibly stopping engine 11 immediately when catalyst temperature Tc reaches the predetermined temperature value $Tc_0$ during the misfire period.

(D) In presence of the misfire decision, that is, when integrated HEV controller 25 determines that the misfire occurs, engine 11 is operated only for the purpose of driving first motor/generator (MG1) 12 in presence of a battery recharge requirement, but not operated as a propelling power source for vehicle propulsion. That is to say, integrated HEV controller 25 inhibits engine 11 from being operated as a propelling power source and permits only the motor propelled vehicle driving mode achieved by means of second motor/generator (MG2) 13. In this case, if there is no battery recharge requirement, engine 11 is stopped. On the contrary, if the state of battery charge (SOC) becomes less than predetermined reference value and thus integrated HEV controller 25 determines that a battery recharge is needed, operation of engine 11 is initiated to drive first motor/generator (MG1) 12 for a battery recharge. Additionally, the traveling speed of the hybrid vehicle (HEV) during the misfire period is limited to such a speed value as to be able to run the hybrid vehicle by way of only the motor power output produced by second motor/generator (MG2) 13. As discussed above, when the engine misfire occurs, operation of engine 11 is limited only for the purpose of a battery recharge. Operation and stoppage of engine 11 are repeatedly executed depending on the battery's state of charge (SOC), in other words, depending on the presence or absence of a battery recharge requirement. Thus, the catalyst temperature tends to drop in the engine stopped period, thereby enabling the hybrid vehicle to be continually propelled within limits, that is, within the maximum power output of second motor/generator (MG2) 13, while suppressing the catalyst temperature rise and thus avoiding the catalyst from being damaged.

(E) In presence of the misfire decision, that is, when integrated HEV controller 25 determines that the misfire occurs, the misfire-period engine operating range (the misfire-period engine speed (exactly, target engine speed TNmg1) and misfire-period engine torque(exactly, target engine torque TTeng)) is optimally properly set depending on the misfire rate Rmis, using the preprogrammed control map shown in FIG. 3. Fundamentally, the engine torque (TTeng) and engine speed (TNmg1) are set to such low values that the catalyst cannot be damaged even when engine 11 is continuously operated for a predetermined time period. As is generally known, the greater the engine misfire rate Rmis, the greater the damage (or the heat deterioration) to the catalyst. Thus, the greater the misfire rate Rmis, the lower the set values of target engine torque TTeng and target engine speed TNmg1 (see the misfire-period engine operating characteristic line F shown in FIG. 3). In addition to the above, in the system of the embodiment, target engine torque TTeng and target engine speed TNmg1 are both set within a predetermined operating range that satisfies predetermined limits defined by the two inequalities $W \geq W_{max} \times k$ and $\beta \geq \beta_{max} \times j$. This contributes to shortened battery recharging time, in other words, shortened engine operating time. Furthermore, according to the system of the embodiment, it is possible to select or determine such an engine operating point that target engine speed TNmg1 is set to as high an engine speed value as possible and target engine torque TTeng is set to as low an engine torque value as possible within the aforesaid predetermined limits. Therefore, it is possible to effectively suppress or reduce undesired and uncomfortable noises and vibrations, which may be created due to the engine misfire.

(F) Assuming that at a comparatively great misfire rate Rmis an engine operating range (target engine speed TNmg1 and target engine torque TTeng) is set so that the battery can be adequately recharged, there is an increased tendency for both of the target engine speed and the target engine torque to be set to relatively greater values. In such a case, there is a possibility that the catalyst is damaged. To avoid this, the system of the embodiment can detect or estimate catalyst temperature Tc, and compare the catalyst temperature to predetermined temperature $Tc_0$ above which the catalyst may be damaged. If catalyst temperature Tc reaches predetermined temperature $Tc_0$, the system of the embodiment inhibits or stops operation of engine 11 until the catalyst temperature Tc becomes fallen sufficiently (see the flow from step S13 to step S14 in FIG. 2). Thus, it is possible to reliably certainly avoid the catalyst from being damaged, while recharging the battery as much as possible.

The entire contents of Japanese Patent Application No. P2002-74031 (filed Mar. 18, 2002) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A hybrid vehicle comprising:
    an internal combustion engine serving as a propelling power source for vehicle propulsion;
    an electric motor serving as a propelling power source for vehicle propulsion;
    an electric generator driven by the engine for power generation;
    a battery electrically connected to the motor and the generator;
    sensors and switches for detecting operating conditions on the engine and the vehicle; and
    a control system electrically connected to the engine, the motor, the generator, the battery and the sensors and switches, for controlling the engine, the motor and the generator; the control system comprising:
    (i) an engine misfire determination section that determines whether an engine misfire occurs; and
    (ii) a control section that permits operation of only the motor as the propelling power source to establish a motor propelled vehicle driving mode and simultaneously inhibits operation of the engine, under a predetermined first condition comprising at least a condition that the engine misfire occurs, the predetermined first condition comprising a condition that a state of charge of the battery is greater than or equal to a predetermined reference value, and that permits operation of the motor as the propelling power source to establish the motor propelled vehicle driving mode and simultaneously permits operation of the engine for driving the generator only for a battery recharge, under a predetermined second condition that the engine misfire occurs and the state of charge of the battery is less than the predetermined reference value.

2. The hybrid vehicle as claimed in claim 1, wherein:
    the control section sets an operating range of the engine depending on a misfire rate of the engine when satisfying the predetermined second condition.

3. The hybrid vehicle as claimed in claim 2, wherein:
    the control section sets a target engine speed of the engine operating range to a misfire-period maximum possible rotational speed existing within a limited range that at least an efficiency of the generator is greater than or equal to a predetermined efficiency.

4. The hybrid vehicle as claimed in claim 2, wherein:
    the control section sets a target engine speed of the engine operating range to a misfire-period maximum possible rotational speed existing within a limited range that an efficiency of the generator is greater than or equal to a predetermined efficiency and an energy generated by the generator is greater than or equal to a predetermined energy.

5. The hybrid vehicle as claimed in claim 1, wherein: the control section forcibly inhibits operation of the engine under a condition that the engine misfire occurs and a catalyst temperature exceeds a predetermined temperature value.

6. The hybrid vehicle as claimed in claim 1, wherein:
    the engine adapted to drive main drive wheels of the vehicle; and
    the motor adapted to drive auxiliary drive wheels of the vehicle;
    which further comprises:
    a clutch element that connects and disconnects the main drive wheels to and from each of the engine and the generator.

7. A hybrid vehicle comprising:
    an internal combustion engine serving as a propelling power source for vehicle propulsion;
    an electric motor serving as a propelling power source for vehicle propulsion;
    an electric generator driven by the engine for power generation;
    a battery electrically connected to the motor and the generator;
    sensors and switches for detecting operating conditions on the engine and the vehicle; and
    a control system electrically connected to the engine, the motor, the generator, the battery and the sensors and switches, for controlling the engine, the motor and the generator; the control system comprising:
    (i) engine misfire determination means for determining whether an engine misfire occurs; and
    (ii) control means for permitting operation of only the motor as the propelling power source to establish a motor propelled vehicle driving mode and simultaneously for inhibiting operation of the engine, under a predetermined first condition comprising at least a condition that the engine misfire occurs, the predetermined first condition comprising a condition that a state of charge of the battery is greater than or equal to a predetermined reference value, and for permitting operation of the motor as the propelling power source to establish the motor propelled vehicle driving mode and simultaneously permitting operation of the engine for driving the generator only for a battery recharge, under a predetermined second condition that the engine misfire occurs and the state of charge of the battery is less than the predetermined reference value.

* * * * *